Figure 1:
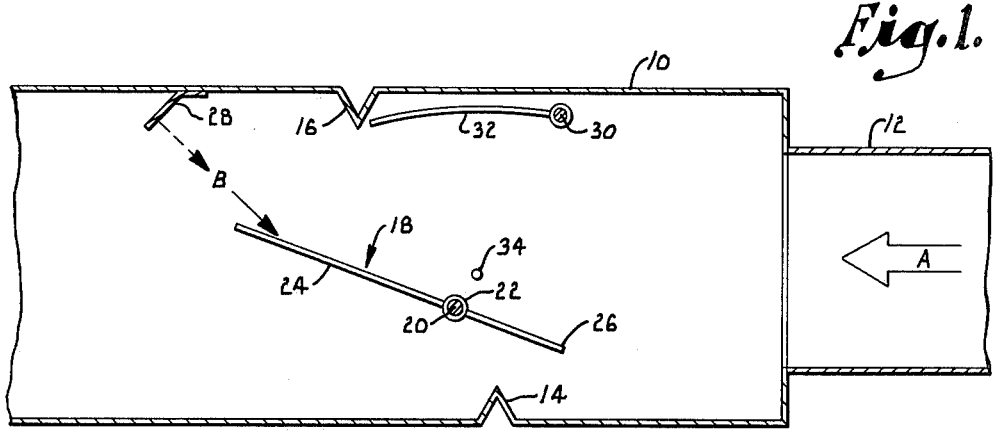

United States Patent [19]

Dean

[11] 4,246,918
[45] Jan. 27, 1981

[54] METHOD AND APPARATUS FOR FORCED AIR BALANCING OF DAMPER BLADES

[75] Inventor: Raymond H. Dean, Shawnee Mission, Kans.

[73] Assignee: Tempmaster Corporation, Kansas City, Mo.

[21] Appl. No.: 10,541

[22] Filed: Feb. 9, 1979

[51] Int. Cl.³ .................................................. F16K 1/22
[52] U.S. Cl. ........................................ 137/1; 137/499; 251/283; 251/305
[58] Field of Search ............... 137/1, 9, 499; 251/281, 251/283, 305, 308

[56] References Cited

U.S. PATENT DOCUMENTS

| | | | |
|---|---|---|---|
| 3,144,040 | 8/1964 | White | 251/307 X |
| 3,817,452 | 6/1974 | Dean | 236/49 |

FOREIGN PATENT DOCUMENTS

| | | | |
|---|---|---|---|
| 1472745 | 1/1967 | France | 251/305 |
| 504037 | 3/1976 | U.S.S.R. | 251/305 |
| 571648 | 9/1977 | U.S.S.R. | 251/305 |
| 602731 | 4/1978 | U.S.S.R. | 251/305 |

Primary Examiner—Robert G. Nilson
Attorney, Agent, or Firm—Lowe, Kokjer, Kircher, Wharton & Bowman

[57] ABSTRACT

The present invention encompasses a method and apparatus for assisting in the operation of air control dampers. An air deflector is positioned downstream from a rotatable damper in an air conduit. The deflector is positioned to direct air moving over one side of the damper against the damper during opening to assist in the opening movement and thereby reduce the amount of weight which would otherwise be required. The same deflector is positioned so that upon closing of the damper air will be deflected against the opposite side of the damper blade to augment the torque forces tending to close the damper while also reducing the pressure drop from one side of the damper to the other. In another embodiment of the invention a sail blade is provided upstream from the control damper to assist in closing the damper at low flow conditions. The sail blade is of relatively lightweight construction so that it will close at a higher pressure than the main control damper thereby partially blocking the flow of air across the damper. This results in increasing the static pressure upstream on the pneumatic pressure sensitive taps to effect actuation of the closing mechanism. During normal operation of the damper the sail blade is moved to an out of the way position because of its relatively lightweight construction which causes it to open at a lower pressure than the main control damper.

10 Claims, 3 Drawing Figures

METHOD AND APPARATUS FOR FORCED AIR BALANCING OF DAMPER BLADES

This invention relates generally to air control techniques and, more particularly, to a method and apparatus for facilitating opening and closing of an air control damper.

Large buildings normally utilize air ducts as an integral part of the heating, cooling, and ventilation systems. Inherent in any type of forced air system is the need to vary the volume of air flow depending upon the need at a particular area. The air flow will need to be increased and decreased in order to meet thermostatically controlled heating and cooling as well as ventilation requirements. Air flow control is normally maintained utilizing dampers in the air ducts.

Manifestly, a criteria for any large air control system is repeatability of the damper operation so as to maintain consistent and comfortable environmental conditions. An efficient manner of controlling damper movement has been found to be through the utilization of pneumatic bladders or bags which operate the damper in response to variations in pressure in the air duct. A typical bladder actuated control damper is shown and described in U.S. Pat. No. 3,817,452 issued June 18, 1974 and which is incorporated herein by reference.

With a damper construction as disclosed in the referenced patent, weights are usually added to the downstream portion of the damper blade to assist in opening the damper. When the damper is to be closed the actuating force must then overcome the weight effect as well as the dynamic forces resulting from air flow which resist the closing movement.

In the case of a self powered operating damper as disclosed in the referenced patent which is dependent upon pressure sensitive pneumatic taps located upstream from the damper, the pressure under low air flow conditions may not be adequate to effect operation of the actuator. This problem may be overcome to some degree by adding a perforated metal baffle or other resistance upstream of the damper assembly, but downstream of the pneumatic pressure sensors.

Accordingly, by utilizing auxiliary weights to assist in opening of the damper and artificial resistance to enhance pressure under low air flow conditions satisfactory operation for a self powered damper is obtained. The weights and artificial resistance means add to the overall cost of the system, however, and are often the first parts of a pneumatic system to become loose and cause noise problems. The resistance from air moving past a perforated metal baffle increases the noise level even when the system is mechanically tight. A further disadvantage is that the artificial resistance necessary to effect operation at low air flow conditions increases the operating pressure under all conditions. This results in increased energy consumption.

It is therefore a primary object of the present invention to provide a method and apparatus for assisting in the opening and closing of air dampers which permits the pneumatic system being controlled to be operated at a lower overall pressure than is possible utilizing certain prior art teachings and thereby reducing energy consumption.

An important objective of the invention is to provide a method and apparatus for assisting in the operation of an air control damper which reduces the possibility for noise in the system by eliminating some components which have heretofore been prone to cause noise problems.

It is one of the aims of this invention to provide a method and apparatus for effecting operation of an air control damper which reduces the cost in initial installation to prior art systems which have utilized larger quantities of damper blade weights and artificial resistance baffles.

One of the objectives of the invention is to provide a method and apparatus for increasing the static pressure on the pressure sensitive pneumatic taps only during low air flow conditions so that the normal operating pressure of the system will not be increased.

Figure 2:
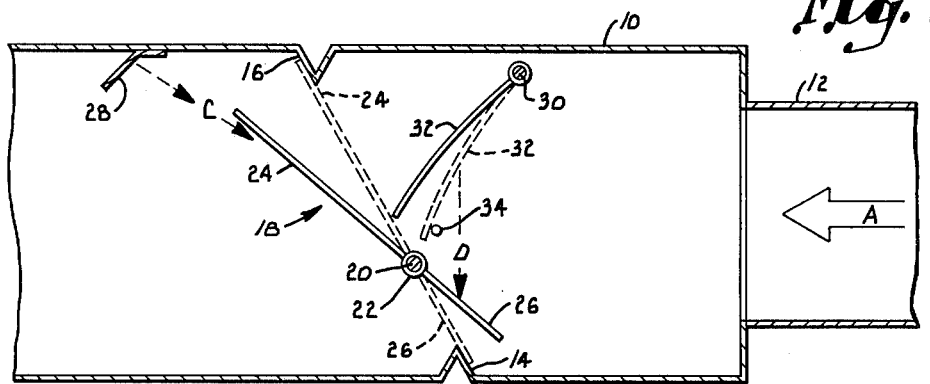
Figure 3:
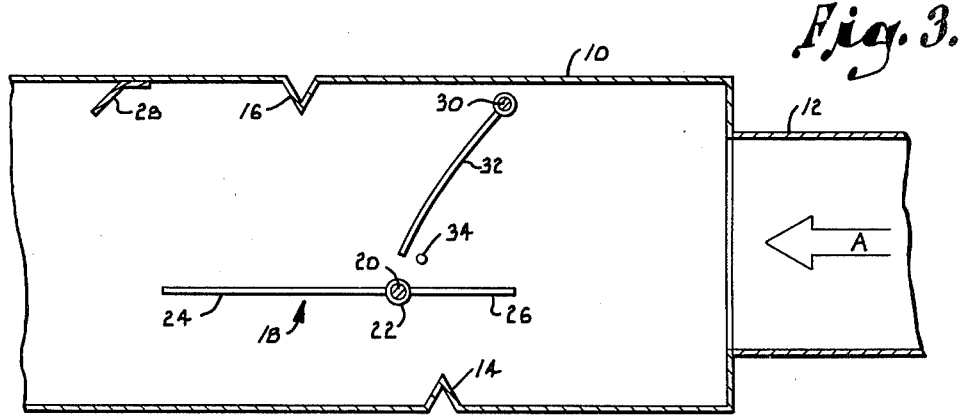

Other objects of the invention will be made clear or become apparent from the following description and claims when read in light of the accompanying drawing wherein:

FIG. 1 is a vertical cross-sectional view through an air conduit and illustrating an air control damper in association with the apparatus of the present invention when the damper is in its open position;

FIG. 2 is another vertical cross-sectional view through an air conduit illustrating an air control damper and the apparatus of the present invention in their relative positions as the damper moves toward a closed position; and FIG. 3 is a vertical cross-sectional view through an air conduit illustrating an air control damper in association with the apparatus of the present invention when air flow has dropped to a low level.

Referring initially to FIG. 1 an air conduit 10 is in communication with an inlet duct 12 and is disposed for directing air flow throughout a building. Offset projecting segments of the conduit walls present damper stops 14 and 16.

An air control damper is disposed interiorly of conduit 10 and is designated generally by the numeral 18. Control damper 18 includes a generally horizontally disposed axle 20 which transverses the distance between two opposing sidewalls of conduit 10. Axle 20 is mounted for pivotal movement about its longitudinal axis. Mounted on the axle is a damper blade which includes a hub portion 22, a downstream blade portion 24 and an upstream blade portion 26. It is to be noted that the downstream portion 24 is longer than the upstream portion 26.

Disposed above the damper blade when the latter is in its open position and downstream from the most downstream end of portion 24 is a deflector baffle 28. Baffle 28 is mounted against the upper sidewall of conduit 10 and has a leg which projects into the air stream at an angle of approximately 45°.

A second axle 30 is located adjacent the uppermost sidewall of conduit 10 and pivotally mounts a generally curvilinear sail blade 32 in upstream relationship to the pivotal axis of damper 18. The location of blade 32 is also downstream from the pressure sensitive pneumatic taps (not shown) referred to above. A stop 34 is located slightly above and upstream of axle 20 so that when sail blade 32 is in its closed position it will extend in an arc which transverses axle 20.

It is to be understood that the invention herein described will normally be utilized in conjunction with a self powered damper operated by an air bag or bladder of the type shown and described in the above referenced patent. The actuator and associated air bladder have been omitted from the drawings of the present application in the interest of brevity and clarity.

Air flow through conduit 10 is in the direction of arrow 'A' in FIG. 1. As damper 18 approaches an open position air flowing through the conduit will strike baffle 28 and be deflected in the direction of arrow 'B' in FIG. 1. The deflected air will act against the "top" side of portion 24 to increase the static pressure at that location. Thus the torque forces tending to open the damper are augmented and opening is achieved at lower air flow conditions and with reduced damper blade weights. In some instances weights may even be completely eliminated through utilization of baffle 28. The technique of locating axle 20 off center so that downstream portion 24 is longer than upstream portion 26 has heretofore been known. This also increases the torque forces tending to open the damper.

As damper 18 approaches a closed position as illustrated in FIG. 2, the function of baffle 28 changes. As the upstream portion 24 moves past baffle 28, air passing over the "top" side of the damper will be deflected in the direction of arrow 'C' in FIG. 2 against the opposite or "bottom" side of the upstream portion, thereby reducing the pressure drop across the damper which tends to hold it open and also augmenting the positive forces acting to close the damper. The fully closed position is illustrated in broken lines in FIG. 2 with the upstream and downstream portions engaging stops 14 and 16 respectively.

During normal air flow through conduit 10 sail blade 32 will be in its fully open position shown in FIG. 1. To this end, sail blade 32 is of relatively lightweight construction so that the force required to move the blade into its open position is less than the force required to open damper 18. Thus the design is such that blade 32 will always be open and out of the way whenever damper blade 18 is open. Likewise, blade 32 will be operable to move toward its closed position in response to an air pressure which is greater than the air pressure which causes damper 18 to close. Thus, when air pressure in conduit 10 begins to drop sail blade 32 will move to the position shown in FIG. 2 to at least partially block air flow over the top side of downstream damper portion 24. By blocking off most of the air flow over the downstream portion 24 the pressure on the top side of the damper is reduced thus making it easier for the actuator to close the damper. The presence of sail blade 32 in its closed position resting against stop 34 will also increase the static pressure in the direction of arrow 'D' on the upstream portion 26 further augmenting the forces tending to close the damper.

During low air flow conditions sail blade 32 will move towards its closed position resting against stop 34 before the pressure drop is sufficient to cause damper 18 to commence closing. Thus the two blades will assume the relative positions shown in FIG. 3. Under these circumstances blade 32 will substantially block air flow over the top side of damper 18 thus increasing the static pressure upstream of the damper. This increased pressure is utilized to assist in actuating the aforementioned upstream operating controls. As the controls take over and damper 32 approaches its closed position sail blade 32 will continue to augment the closing forces in the manner above described.

By utilizing the teachings of the present invention the torque requirements for closing an air control damper may be reduced, the damper blade weights required for opening may be reduced, the overall operating pressure may be lowered, and the noise level of the operating system is also reduced. While the invention has been particularly described and is intended to be used primarily with a self powered damper as disclosed in the referenced patent it will be appreciated that the invention is applicable to any type of control damper whether it is self powered or relies upon an independent power source.

I claim:

1. In an air control damper for regulating the flow of air through a conduit and wherein said damper is characterized by an upstream portion and a downstream portion and is pivotal about an axis from an open to a closed position, the improvement comprising:
    means for deflecting air moving through the conduit onto one side of the downstream portion of said damper as the latter approaches its open position, thereby assisting in opening the damper,
    said deflecting means being disposed downstream from the end of said damper when the latter is in its open position and being disposed for directing air against the opposite side of said downstream portion as the damper approaches a closed position thereby assisting in closing the damper.

2. The invention of claim 1, wherein said damper axis is off center between said upstream and downstream portions and the latter portion is longer than the former.

3. The invention of claim 2, wherein said conduit is disposed generally horizontally and said downstream portion of said damper is disposed above said upstream portion.

4. In an air control damper for regulating the flow of air through a conduit and wherein said damper is characterized by an upstream portion and a downstream portion and is pivotal about an axis from an open to a closed position, said damper being operable in response to a first air pressure to move toward its open position and being operable in response to a second air pressure to move toward its closed position, the improvement comprising:
    means for blocking air flow through at least part of that portion of said conduit which is blocked by said upstream portion when the latter is in its closed position;
    means for mounting said air blocking means for pivotal movement about an axis from an open to a closed position, said axis being located upstream in said conduit relative to the pivot axis for said damper,
    said air blocking means being operable in response to an air pressure which is less than said first air pressure to move toward its open position and being operable in response to an air pressure which is greater than said second air pressure to move toward its closed position.

5. The invention of claim 4, wherein said mounting means is disposed adjacent one side of said conduit and said pivotal axis for said blade means is located at one end of said blade means.

6. The invention of claim 5, wherein said blade means is held in its open position by air flow through said conduit.

7. The invention of claim 4, wherein said damper axis is off center between said upstream and downstream portions and the latter portion is longer than the former.

8. The invention of claim 4, wherein is included means for deflecting air moving through the conduit onto one side of the downstream portion of said damper as the latter approaches its open position, thereby assisting in opening the damper, said deflecting means being disposed for directing air against the opposite side of said downstream portion as the daamper approaches a closed position thereby assisting in closing the damper.

9. In an air control system comprising a conduit for directing air flow, a damper in said conduit for blocking air flow, said damper being characterized by an upstream portion and a downstream portion, said damper being operable in response to a first air pressure to move towards its open position and being operable in response to a second air pressure to move toward its closed position, the method of operating said damper comprising:
first partially blocking the flow of air across one side of said downstream portion of said damper only; and
then moving said damper toward its closed position.

10. A method as set forth in claim 9, wherein is included the step of diverting a portion of any air moving across said one side of said downstream portion back against the opposite side of said downstream portion as said damper approaches its closed position thereby assisting in said closing.

* * * * *